June 15, 1926.
L. McCARTHY
1,588,600
MANUFACTURE OF COMPOSITE SHEET MICA AND THE LIKE
Filed May 27, 1925   2 Sheets-Sheet 1
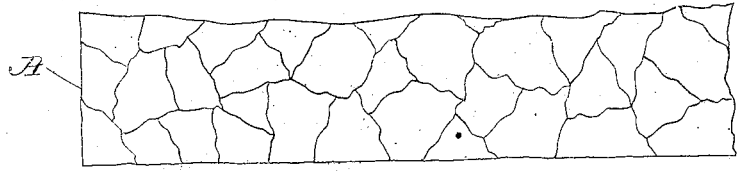
Fig. 1.
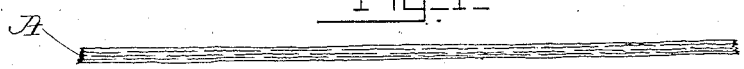
Fig. 2.
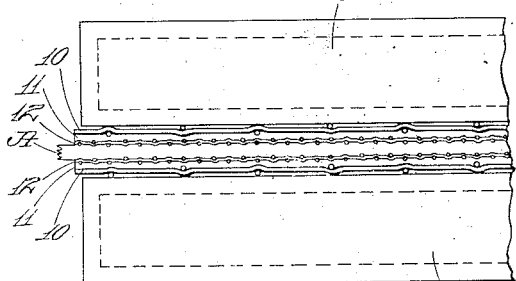
Fig. 8.
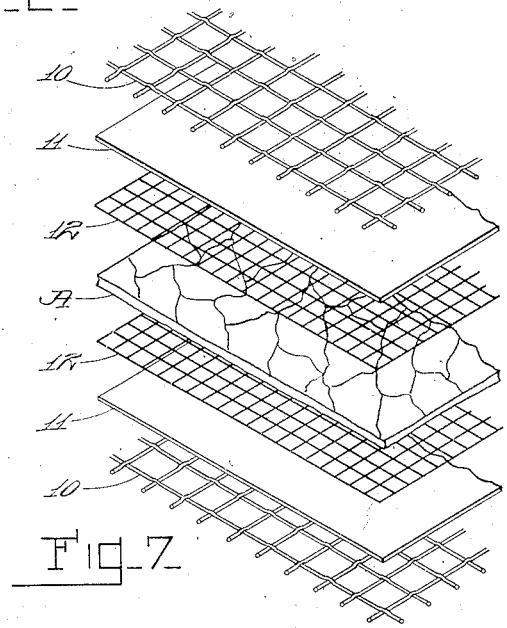
Fig. 7.
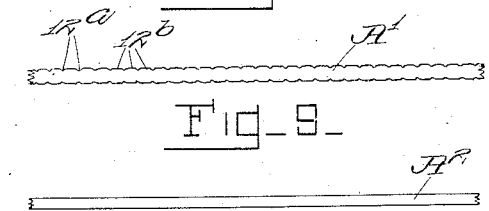
Fig. 9.
Fig. 10.
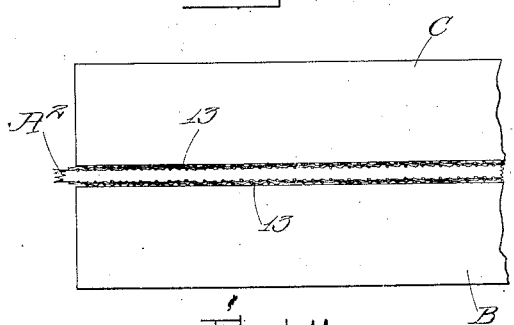
Fig. 11.
Fig. 12.
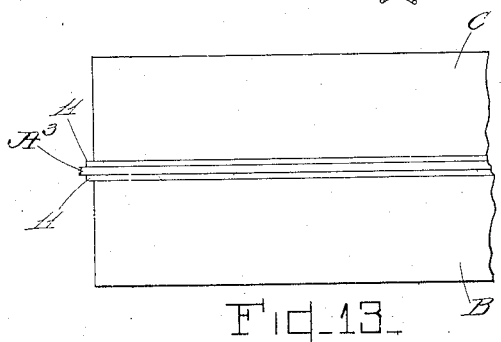
Fig. 13.
Fig. 14.
INVENTOR
Louis McCarthy,
by Macleod, Calvert, Copeland & Dike
Attys June 15, 1926.  1,588,600
L. McCARTHY
MANUFACTURE OF COMPOSITE SHEET MICA AND THE LIKE
Filed May 27, 1925   2 Sheets-Sheet 2
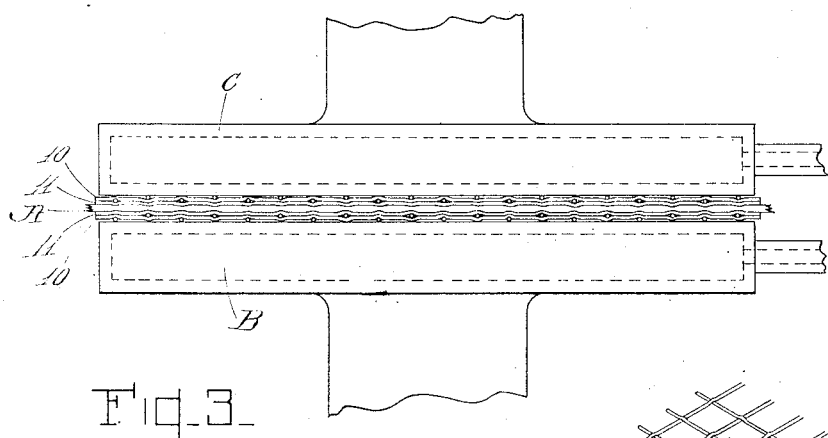
Fig. 3.
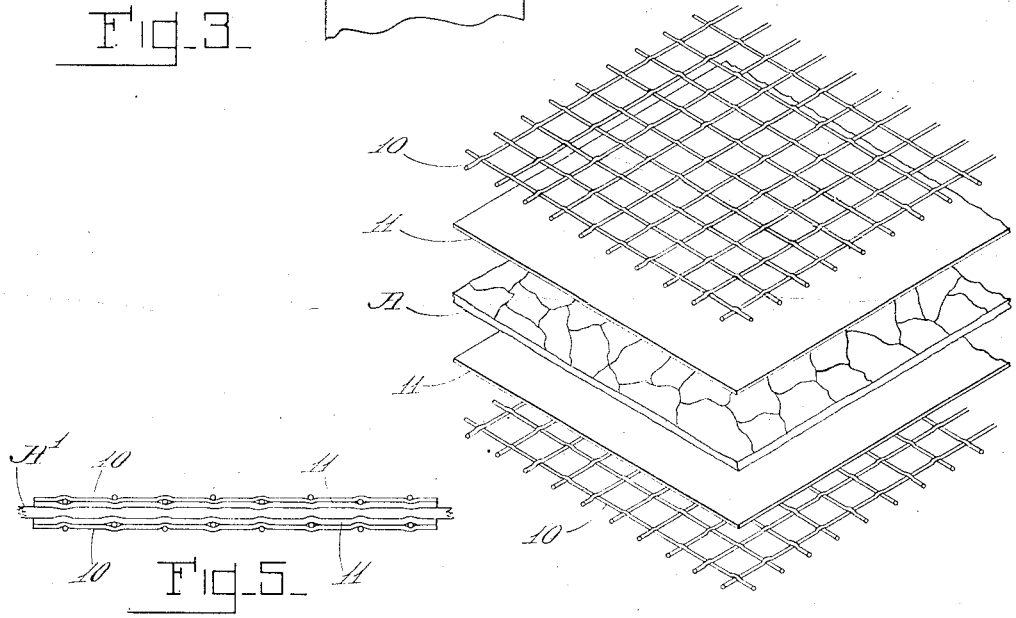
Fig. 4.
Fig. 5.
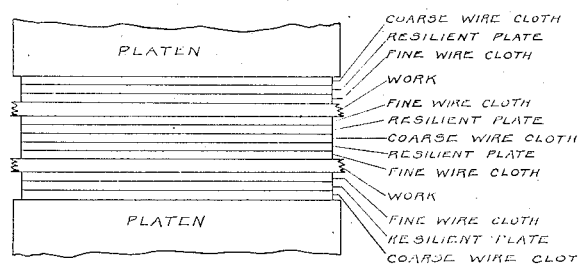
Fig. 6.

Patented June 15, 1926.

1,588,600

UNITED STATES PATENT OFFICE.

LOUIS McCARTHY, OF BOSTON, MASSACHUSETTS, ASSIGNOR TO THE MACALLEN COMPANY, OF BOSTON, MASSACHUSETTS, A CORPORATION OF MASSACHUSETTS.

MANUFACTURE OF COMPOSITE SHEET MICA AND THE LIKE.

Application filed May 27, 1925. Serial No. 33,281.

The present invention relates to the manufacture of composite sheet mica now largely employed in the electrical arts. The general object of the invention is to provide a method of and means for making composite mica sheets which will reduce the amount of loss due to injured or defective material and thereby reduce the cost of the finished product, and which will also improve the quality of the latter.

The composite sheet mica to which the present invention relates consists of laminæ or flakes of mica laid on one another in overlapping relation and secured together by a suitable insulating binder or adhesive as, for instance, a solution of shellac in alcohol. In manufacturing composite sheet mica commercially, successive layers of the flakes or laminæ of mica are laid up and cemented together by means of the adhesive compound. Thereafter, the sheet is baked in a hot press which forces out the occluded air and the surplus adhesive and densifies the whole. Heretofore, great difficulty has been experienced in producing these goods because the work adheres so closely to the press elements that it cannot be separated from them without destroying the work, and it has been necessary to discard large quantities of sheets on this account. Unsuccessful attempts have been made to overcome these difficulties by coating the press elements with powdered mica, talc, or with some greasy material, such as oil or animal fat. Attempts have also been made to press the material between canvas sheets. While this has decreased the tendency to adhesion somewhat, it has not been entirely successful. Moreover, the binding material impregnates the canvas and can be removed therefrom only with difficulty, it being necessary to wash the canvas under pressure in hot caustic soda, which soon destroys the canvas sheets, requires their frequent renewal, and thus adds further to the cost of production. Altogether these difficulties have increased enormously the expense of the relatively small amount of perfect material produced.

The present invention has, therefore, for certain of its more particular objects to do away with these difficulties, to eliminate altogether the loss of material due to sticking, to accomplish these results without the use of apparatus which is destroyed or injuriously affected during the process, and to produce a composite mica sheet of great strength and density and having smoothly finished surfaces.

The foregoing and other objects of the invention will best be understood from the following description of certain appliances and operations which may be employed in carrying the same into effect. It will be understood however that the particular materials, apparatus and operations described and shown have been chosen for illustrative purposes merely, and that the invention, as defined by the claims hereunto appended, may be otherwise embodied and practised without departure from its spirit and scope.

In said drawings:

Fig. 1 is a plan view and Fig. 2 an edge view of a portion of a sheet of mica as it comes from the laying machines or from the hand-operators who prepare it for the presses.

Fig. 3 is a side elevation of the press elements and the work therein.

Fig. 4 shows in perspective and separated from each other the several sheets of material which, in accordance with one mode of practicing the invention, are placed on each side of the work when the same is in the press.

Fig. 5 is an enlarged detail edge view of the work after pressing.

Fig. 6 is a diagrammatic side view illustrating the preferred method of charging the press.

Fig. 7 is a view similar to Fig. 4 showing another arrangement of sheets.

Fig. 8 is a view similar to Fig. 3 of the arrangement shown in Fig. 7.

Fig. 9 is an edge view showing the work after the first pressing.

Fig. 10 is a similar view showing the work after it has been sanded.

Fig. 11 is a side view showing the work in the press during the second pressing.

Fig. 12 is a view similar to Fig. 9 showing the work after the second pressing.

Fig. 13 is a view similar to Fig. 11 showing the final pressing.

Fig. 14 is a view similar to Fig. 9 showing the completed work.

At A in Figs. 1 and 2 is shown a composite mica sheet ready to be pressed. It will be understood that this sheet is built up from individual plates or flakes of mica disposed in successive layers and cemented together by a suitable adhesive or binder of insulating material, usually shellac, asphaltum, or mixtures of these or other resins, gums, or pitches, dissolved in a suitable solvent, such as alcohol. As will be understood by those skilled in the art, such a composite sheet, after having been built up as described, is first subjected to heat in a drying oven to drive off the solvent, and is thereafter subjected to a higher degree of heat together with heavy pressure for the purpose of forcing out the occluded air and surplus binder, densifying the sheet, and setting or solidifying the binder.

In carrying out my improved process or method, I prefer first to place on one platen B (Figs. 3 and 8) of a hot press of any well known type a sheet of relatively coarse mesh wire cloth 10 (see also Figs. 4 and 7) having about three meshes to the inch, although this is capable of considerable variation. On this sheet of wire cloth is placed a thin sheet 11 of steel or other resilient material of such character that it will be bent or deformed by the pressure to which the work is subjected but will return to its original flat condition when the pressure is released. The work A may then be placed directly upon the plate or sheet 11, as shown in Figs. 3 and 4, although, as shown in Figs. 7 and 8, I prefer to interpose between the plate 11 and the work sheet 12 of relatively fine mesh wire cloth, preferably having about thirty meshes to the inch. On top of the work A is placed a similar arrangement of sheets in reverse order, that is to say, in the order named, a sheet 12 of relatively fine mesh wire cloth (if such a sheet has been employed beneath the work), a thin steel sheet 11, and a sheet 10 of relatively coarse mesh wire cloth.

The assembly of sheets above described constitutes a unit or, as it is known in practice, a "form", which may be inserted alone between the press platens B and C, as shown in Figs. 3 and 8. Preferably, however, and as shown in Fig. 6, a plurality of such units may be superimposed upon one another and pressed simultaneously. In such case only one sheet 10 of coarse mesh wire cloth need be inserted between the adjacent steel sheets 11 of contiguous units. In Fig. 6 only two such units are shown, but this number may be increased to eight or ten or as many as will transmit the heat of the platens to the extent requisite for satisfactory results. In practice, nine units are usually pressed at one operation.

After being subjected to the proper degrees of temperature and pressure (usually a pressure of about one-thousand pounds per square inch at a temperature about 370° F.) for the requisite length of time (usually about fifty minutes), the unit is removed from the press and the work taken out. It is found that the work will separate easily and without injury from the contiguous sheets. This is due to the combined action of the several interposed sheets of material above described. It has been found that the desired result can be accomplished to a certain degree by the use of fine mesh wire cloth sheets 12 alone, as shown at 13 in Fig. 11, and as hereinafter further described, or by the use of the resilient steel sheets 11 with their backing of coarse mesh wire cloth 10 and without the sheets 12, as shown in Figs. 3 and 4, but in order to secure these advantages to the fullest degree, I prefer to employ all of these sheets as above described and as shown in Figs. 7 and 8. The contribution of the resilient sheets 11 and coarse wire cloth sheets 10 to the result in question is believed to be due to the fact that the wire cloth sheets 10 form a non-uniform support for the resilient sheets 11, so that when the pressure is applied the latter sheets are slightly deformed, as shown in Figs. 3 and 5, but when the pressure is released said sheets tend to assume their natural flat condition and thereby break away from the surface of the work. At all events, I have found by actual experience that when the work is placed between two resilient sheets and the latter unevenly supported during the pressing operation they can be readily separated from the work when the pressure is removed. The fine mesh wire cloth sheets 12 tend to adhere only slightly to the work for the reason that the surfaces presented to the adhesive are relatively small and can be released without material injury to the work, the action being somewhat analogous to that of the canvas sheets heretofore used, but being much more effective in the production of the desired result. Moreover these wire cloth sheets may be readily cleaned without injury. The interposition of said wire cloth sheets between the work and the platens, or between the work and the resilient sheets 11, is also preferred for the reason that they present to the work, for direct engagement therewith, a foraminous surface which permits the surplus binder or adhesive material to be expressed from the work and accumulate on the surface of the latter within the interstices of the wire cloth.

The work in the condition resulting from the first pressing with the arrangement shown in Fig. 7 is shown in Fig. 9, wherein it is designated A'. The marks of the wire cloth sheets 12 are shown at 12ª, and the projecting masses of binder between said marks at 12ᵇ. A similar surface is formed on the sheet A' when pressed with the arrangement shown in Fig. 4, the local deformation of the resilient sheet 11 by the coarse wire cloth sheet 10 causing the pattern of the latter to be impressed upon the work, as shown in Fig. 5. After the first pressing, the sheet A' is put through a sandpapering or equivalent machine which abrades the surface thereof sufficiently to remove the marks of the wire cloth and the projections 12$^b$ of surplus adhesive material and to reduce the sheet to a uniform thickness, as shown at A$^2$ in Fig. 10.

The sheet A$^2$ is next placed between two sheets 13 of still finer wire cloth (Fig. 11), preferably having about fifty meshes to the inch, and is again subjected to substantially the same temperature and pressure as in the first pressing. This still further densifies the material and draws the remaining surplus binder to the surface, causing the sheet to assume the condition shown at A$^3$ in Fig. 12. The sheet A$^3$ is again sanded to remove the resulting projections of expressed binder and is again returned to the press where it is for the third time subjected to substantially the same temperature and pressure between steel plates 11 which smooth and finish the surface and further densify the work which, in its final form, is shown at A$^4$ in Fig. 14.

The shellac or equivalent adhesive compound employed as a combined binding and insulating material in the manufacture of composite mica sheets has the property of raising its melting point as the effect of repeated curing by combined heat and pressure. In other words, a degree of temperature which, in the first instance, is sufficient to melt the shellac, will, after the latter has been melted and allowed to cool, reduce the same to a somewhat plastic condition only. A third application of the same temperature will render the material only slightly viscous, and after a subsequent cooling will not materially affect it at all. In the first pressing of the composite sheet above described, the binder is reduced to a substantially fluid condition, and the greater portion of the surplus expressed from the work and brought to the surface thereof in the form of the projections 12$^b$, which are removed by subsequent abrasion. During this first pressing of the material the tendency of the latter to stick to the press elements is greatest, and at this time the use of an arrangement of sheets as shown in Figs. 7 and 8 is preferred. During the second pressing of the work, as shown in Fig. 11, the binder is in only a sufficiently plastic condition to cause the remaining surplus to be brought to the surface of the work, so that the use of the fine wire cloth sheets 13 alone is sufficient to prevent sticking, these sheets providing interstices for the reception of the expressed material. At the time of the third pressing, as shown in Fig. 13, all of the surplus binder has been removed and the remainder is in only a slightly viscous condition, having little or no tendency to stick to the press elements, so that the use of the smooth plates 11 is permitted and results in applying a smooth finish to the surface of the work.

By the method and apparatus above described extremely dense composite mica sheets having smoothly finished surfaces, great cohesion, and strong dielectric properties may be produced at relatively low expense and without loss due to defective material or injury to the press elements or other appliances.

Having thus described my invention what I claim is:

1. The method of preventing sticking of work to a press element which consists in interposing a resilient sheet between said press element and the work and locally deforming the sheet during the pressing operation.

2. The method of preventing sticking of work to adjacent press elements which consists in enclosing the work between resilient sheets and locally deforming them during the pressing operation.

3. The method of preventing sticking of work to an adjacent press element which consists in placing the work between resilient sheets and subjecting the whole to pressure while the sheets are unevenly supported.

4. The hereindescribed method of making composite sheet mica which consists in laying up mica flakes with a suitable binder, and then subjecting the sheet to heat and pressure while in contact with a metal screen cloth.

5. The method of preventing sticking of work to a press element which consists in interposing a sheet of wire screen cloth between said press element and the work and in engagement with the latter, interposing a resilient sheet between said press element and screen cloth sheet and locally deforming said resilient sheet during the pressing operation.

6. The method of preventing sticking of work to adjacent press elements which consists in interposing a sheet of relatively fine mesh wire screen cloth between each press element and the work and in engagement with the latter and interposing between each sheet of screen cloth and the adjacent press element a resilient metal sheet backed by a sheet of relatively coarse mesh wire screen cloth.

7. The method of making composite sheet mica which includes pressing the sheet against a foraminous surface to draw the surplus adhesive material to the surface of the sheet and form projections thereon.

8. The method of making composite sheet mica which includes pressing the sheet against an irregular surface to draw the surplus adhesive material to the surface of the sheet and form projections thereon, and thereafter removing said projections.

9. The method of making composite sheet mica which includes pressing the sheet against an irregular surface, sanding the sheet and thereafter subjecting the same to heat and pressure to draw to the surface the insulating binder.

10. The method of making composite sheet mica which includes pressing the sheet against a foraminous surface to draw the surplus adhesive material to the surface of the sheet, and thereafter finishing said sheet by pressing the same against a smooth surface.

11. The method of making composite sheet mica which includes pressing the sheet against a foraminous surface, abrading the surface of the sheet, and thereafter finishing said sheet by pressing the same against a smooth surface.

12. The method of making composite sheet mica which includes pressing the sheet against a foraminous surface to draw the surplus adhesive material to the surface of the sheet and form projections thereon, abrading said surface to remove said projections, repressing the sheet against a finer foraminous surface, and refinishing the sheet by pressing the same against a smooth surface.

13. The method of making composite sheet mica which consists in pressing the sheet against a foraminous surface to draw the surplus adhesive material to the surface of the sheet and form projections thereon, abrading said surface to remove said projections, repressing the sheet against a finer foraminous surface, again abrading the sheet, and finally finishing the sheet by pressing the same against a smooth surface.

14. The method of making composite sheet mica which consists in laying up mica flakes with a suitable liquid binder, subjecting the resulting sheet to heat and pressure against an irregular surface, abrading the surface of the sheet, and again subjecting it to heat and pressure.

15. The method of making composite sheet mica which consists in laying up mica flakes with a suitable binder, subjecting the sheet to heat and pressure between two layers of metal screen cloth, abrading the surface of the sheet to remove the surplus binder and the pattern of the screen cloth, and again subjecting the sheet to heat and pressure to refinish the surface.

16. The method of making composite sheet mica which consists in laying up mica flakes with a suitable binder, subjecting the sheet to heat and pressure between two layers of metal screen cloth, abrading the surface of the sheet to remove the surplus binder and the pattern of the screen cloth, again subjecting the sheet to heat and pressure between two layers of metal screen cloth of finer mesh, and finally subjecting the sheet to heat and pressure to refinish the surface.

17. An apparatus for pressing composite sheet mica which includes a press element, a resilient sheet between the press element and the work, and means for locally deforming said resilient sheet during the pressing operation.

18. An apparatus for pressing composite sheet mica which includes resilient sheets on opposite sides of the work, and means affording non-uniform support for local areas of the sheets during the pressing.

19. An apparatus for making composite sheet mica which consists of a pair of resilient normally flat sheets to receive the work between them, a pair of sheets of wire cloth to afford a non-uniform support for the said resilient sheets, and press elements for exerting pressure through the wire cloth and resilient sheets on the work.

20. The hereindescribed method of making composite sheet mica which consists in laying up mica flakes with a suitable binder, then subjecting the sheet to heat and pressure against a resilient sheet and a screen cloth sheet to locally deform the resilient sheet during the pressing operation.

21. The hereindescribed method of making composite sheet mica which consists in laying up mica flakes with a suitable binder, subjecting the sheet to heat and pressure against an irregular surface, removing surface portions of said sheet, and again subjecting the sheet to heat and pressure.

22. In an apparatus for pressing composite sheet mica, in combination, a press element, a sheet of wire screen cloth between said press element and the work, a resilient sheet between said press element and screen cloth sheet, and means for locally deforming said resilient sheet.

23. In an apparatus for forming composite sheet mica, in combination, a press element, a sheet of relatively fine mesh screen cloth between said press element and the work, a resilient sheet between said press element and screen cloth sheet, and a sheet of relatively coarse mesh wire screen cloth between said press element and resilient sheet.

In testimony whereof I affix my signature.

LOUIS McCARTHY.